United States Patent
Perkinson

(10) Patent No.: US 9,970,300 B2
(45) Date of Patent: May 15, 2018

(54) BRUSH DESIGN FOR PROPELLER DEICING SYSTEM

(71) Applicant: Hamilton Sundstrand Corporation, Windsor Locks, CT (US)

(72) Inventor: Robert H. Perkinson, Stonington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1244 days.

(21) Appl. No.: 14/053,155

(22) Filed: Oct. 14, 2013

(65) Prior Publication Data

US 2015/0104308 A1    Apr. 16, 2015

(51) Int. Cl.
*F01D 5/12* (2006.01)
*B64C 11/20* (2006.01)
*B64D 15/12* (2006.01)

(52) U.S. Cl.
CPC ............... *F01D 5/12* (2013.01); *B64C 11/20* (2013.01); *B64D 15/12* (2013.01)

(58) Field of Classification Search
CPC ............ F01D 5/12; B64C 11/20; B64D 15/12
See application file for complete search history.

(56) References Cited

U.S. PATENT DOCUMENTS

| 2,625,661 | A | | 1/1953 | Haydon |
| 3,002,718 | A | * | 10/1961 | Hackenberger, Jr. .. B64D 15/12 |
| | | | | 244/134 R |
| 4,386,749 | A | | 6/1983 | Sweet et al. |
| 2010/0014976 | A1 | * | 1/2010 | Arel ........................ B64C 11/38 |
| | | | | 416/117 |

FOREIGN PATENT DOCUMENTS

| GB | 979304 A | 1/1965 |
| WO | 9008695 A1 | 8/1990 |

OTHER PUBLICATIONS

European Search Report and Written Opinion; International Application No. 14188536.8; International Filing Date: Oct. 10, 2014; dated Feb. 27, 2015; 6 pages.

* cited by examiner

*Primary Examiner* — Woody Lee, Jr.
*Assistant Examiner* — Maxime Adjagbe
(74) *Attorney, Agent, or Firm* — Cantor Colburn LLP

(57) ABSTRACT

A propeller assembly is provided including a plurality of blades arranged in diametrically opposed pairs. Each of the plurality of blades has an electrical deicer located thereon. The propeller assembly also includes a slip ring, and a stationary brush arranged in contact with the slip ring. The brush is configured to transfer electrical power from a power source to the slip ring. A movable portion of an actuator is configured to sequentially couple the electrical deicers of each pair of blades to the rotating slip ring.

15 Claims, 5 Drawing Sheets

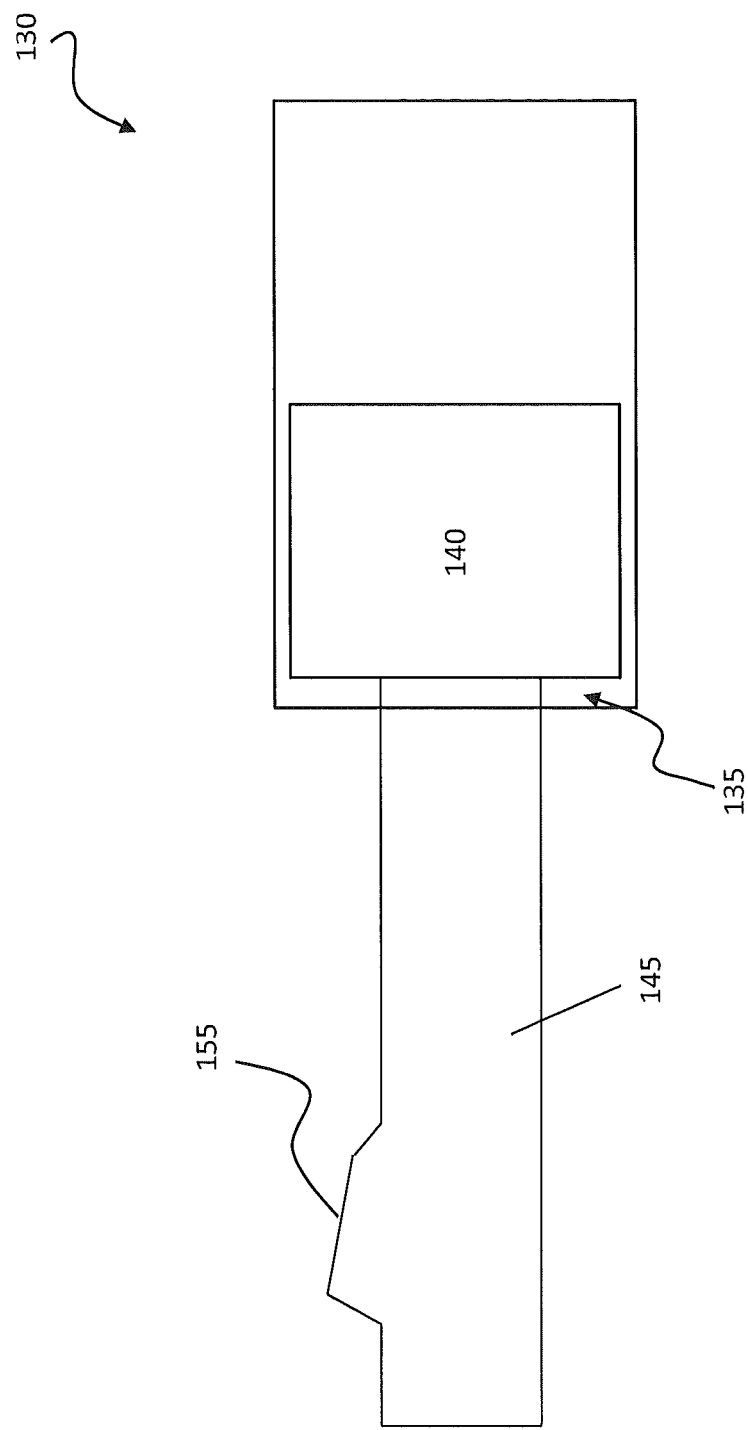

BRUSH DESIGN FOR PROPELLER DEICING SYSTEM

BACKGROUND OF THE INVENTION

Embodiments of the invention relate to aircraft propeller deicing systems, and more particularly, to brush block assemblies for use in propeller deicing systems.

Propeller deicing systems are used to prevent ice build-up on an aircraft's propeller blades. The most common type of deicing system uses resistive heating elements, such as in the form of flexible strips for example, which are disposed along a section of the blade's leading edge closest to the hub assembly. The application of electrical current to the heaters weakens the bond between accumulated ice and the airfoil surface allowing the ice to the "thrown off" by the centrifugal forces generated by rotation of the propeller.

An aircraft power source located on the non-rotating side of the propeller-engine interface provides electrical current to the brushes and through a rotating interface. The interface includes stationary, electrically conductive brushes which are in electrical contact with a conductive slip ring mounted to the rear of the rotating propeller's spinner assembly. The power required for deicing a propeller can be substantial i.e., around two KV per blade. Because of the power requirements, propellers having a large number of blades, such as four or more propeller blades for example, are commonly de-iced in pairs to minimize the peak power requirements of the aircraft and to reduce the likelihood of unbalance due to ice shedding.

BRIEF DESCRIPTION OF THE INVENTION

According to one embodiment of the invention, a propeller assembly is provided including a plurality of blades arranged in diametrically opposed pairs. Each of the plurality of blades has an electrical deicer located thereon. The propeller assembly also includes a slip ring, and a stationary brush arranged in contact with the slip ring. The brush is configured to transfer electrical power from a power source to the slip ring. A movable portion of an actuator is configured to sequentially couple the electrical deicers of each pair of blades to the rotating slip ring.

According to another embodiment of the invention, a method of sequentially supplying power to electrical deicers for each pair of blades of a propeller assembly is provided including moving a movable portion of an actuator into contact with a first relay coupled to the electrical deicers of a first pair of blades. The movable portion of the actuator is moved into contact with a second relay coupled to the electrical deicers of a second pair of blades.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a cross-sectional view of an actuation mechanism according to an embodiment of the invention.

The detailed description explains embodiments of the invention, together with advantages and features, by way of example with reference to the drawings.

DETAILED DESCRIPTION OF THE INVENTION

As described above, one approach is to de-ice propeller blades in parallel. To deice the propeller blades in pairs may require a large number of brush and slip ring circuits to provide power from a power source to the de-icers. The brushes carry a high current and are therefore, heavy, possibly expensive, and may require a significant amount of space in the rotating interface of the propeller.

Figure 1:
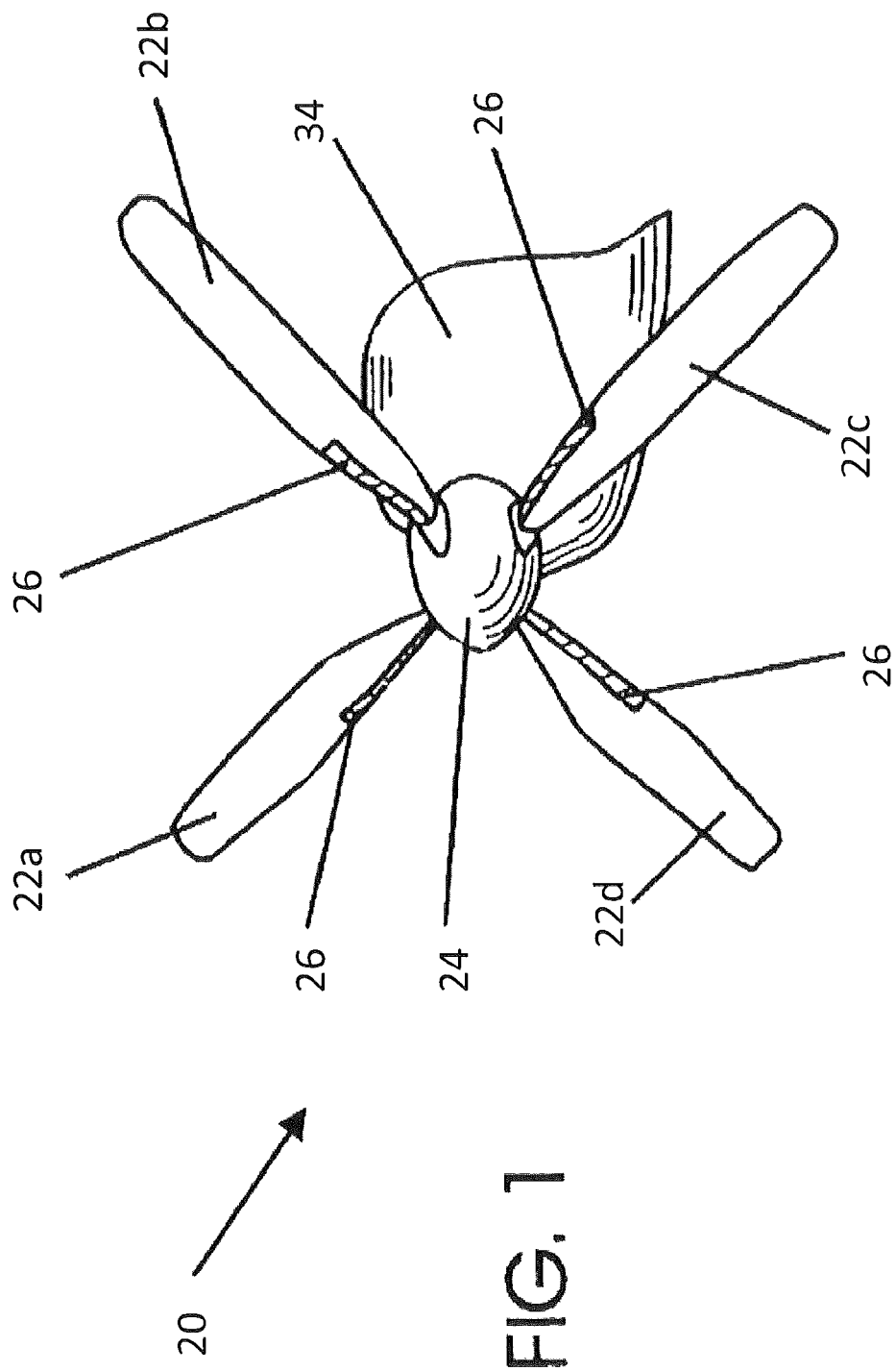
FIG. 1 is a perspective view of a propeller assembly of an aircraft.
Figure 2:
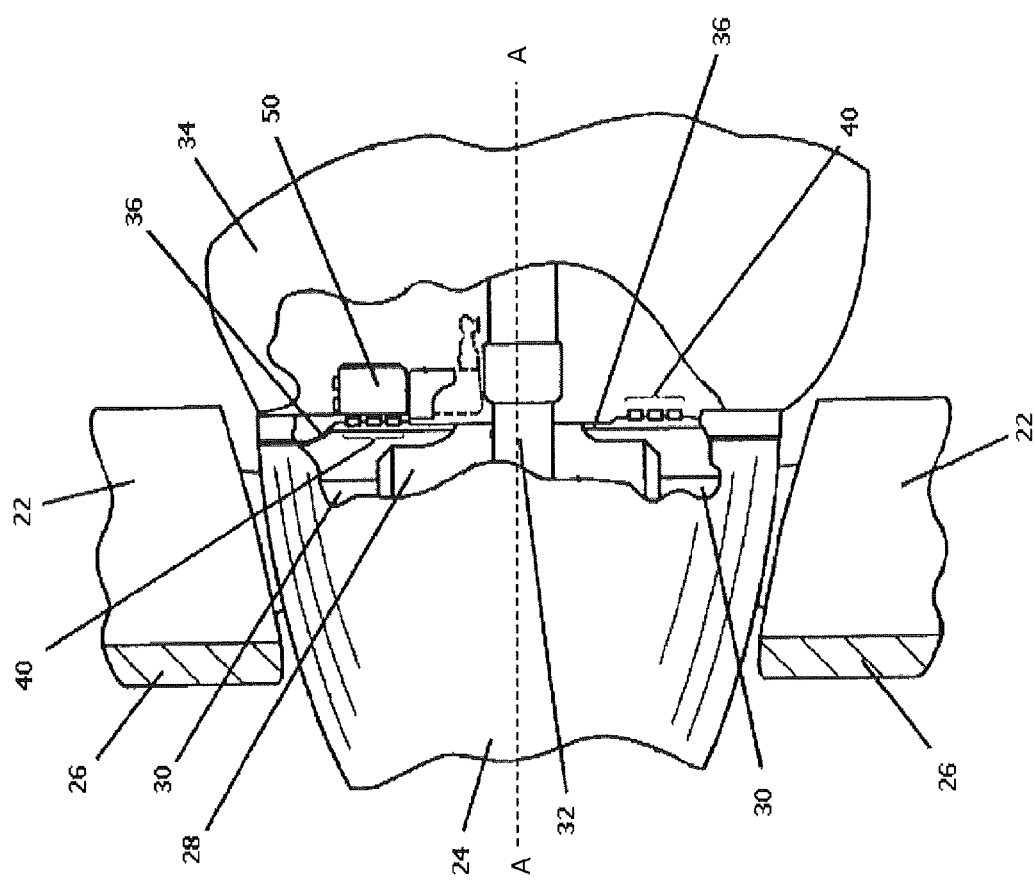
FIG. 2 is a partially removed view of a side of a propeller assembly according to an embodiment of the invention.

Referring now to FIGS. 1 and 2, an example of a propeller assembly 20 of an aircraft is provided in more detail. The propeller 20 includes a plurality of blades 22, such as four blades 22a, 22b, 22c, 22d for example, that are radially spaced about the center of a spinner 24. The plurality of blades 22 are generally arranged in diametrically opposed pairs. The blades 22 typically include a composite material and have an electrical deicer 26, for example a resistive heating element, disposed on the leading edges thereof. The spinner 24 encloses a hub assembly 28 which mechanically secures the spar 30 of each of the propeller blades 22 to an engine shaft 32. The rearward interior portion of the spinner 24, facing the engine cowling 34, includes a bulk head 36 which is fastened along the interior periphery of the spinner 24 and the aft surface of the hub 28. The bulk head 36 is both substantially flat and substantially annular in its geometry and includes a center opening through which a first end (not shown) of the engine shaft 32 connects to the hub assembly 28. The second end (not shown) of the engine shaft 32 is operably coupled to a gas turbine engine (not shown). The engine imparts a rotational force to the engine shaft 32, causing the shaft 32, and therefore the hub 28 and plurality of blades 22 coupled thereto, to rotate about an axis A.

The exposed surface of the bulk head 36 includes a substantially annular portion formed from electrically insulated material having disposed therein one or more concentric annular slip rings 40. Typically, the bulk head 36 includes grooves adapted to receive the slip rings 40, which are bonded therein, such as with an epoxy adhesive or resin for example. The slip rings 40, which may be copper or another conductive material, each include an electrical contact (not shown) extending from the underside of the slip ring 40. The contact projects through the bulk head 36 to the side opposite the slip rings 40 and provides a junction to which the electrical deicers 26 may be connected through electrically conductive wires or leads 42. One or more brushes 52 (see FIG. 3) of a stationary brush block assembly 50 contact the rotating slip rings 40. Power from an electrical source (not shown) is transmitted to the slip rings 40 via the plurality of brushes 52.

Figure 3:
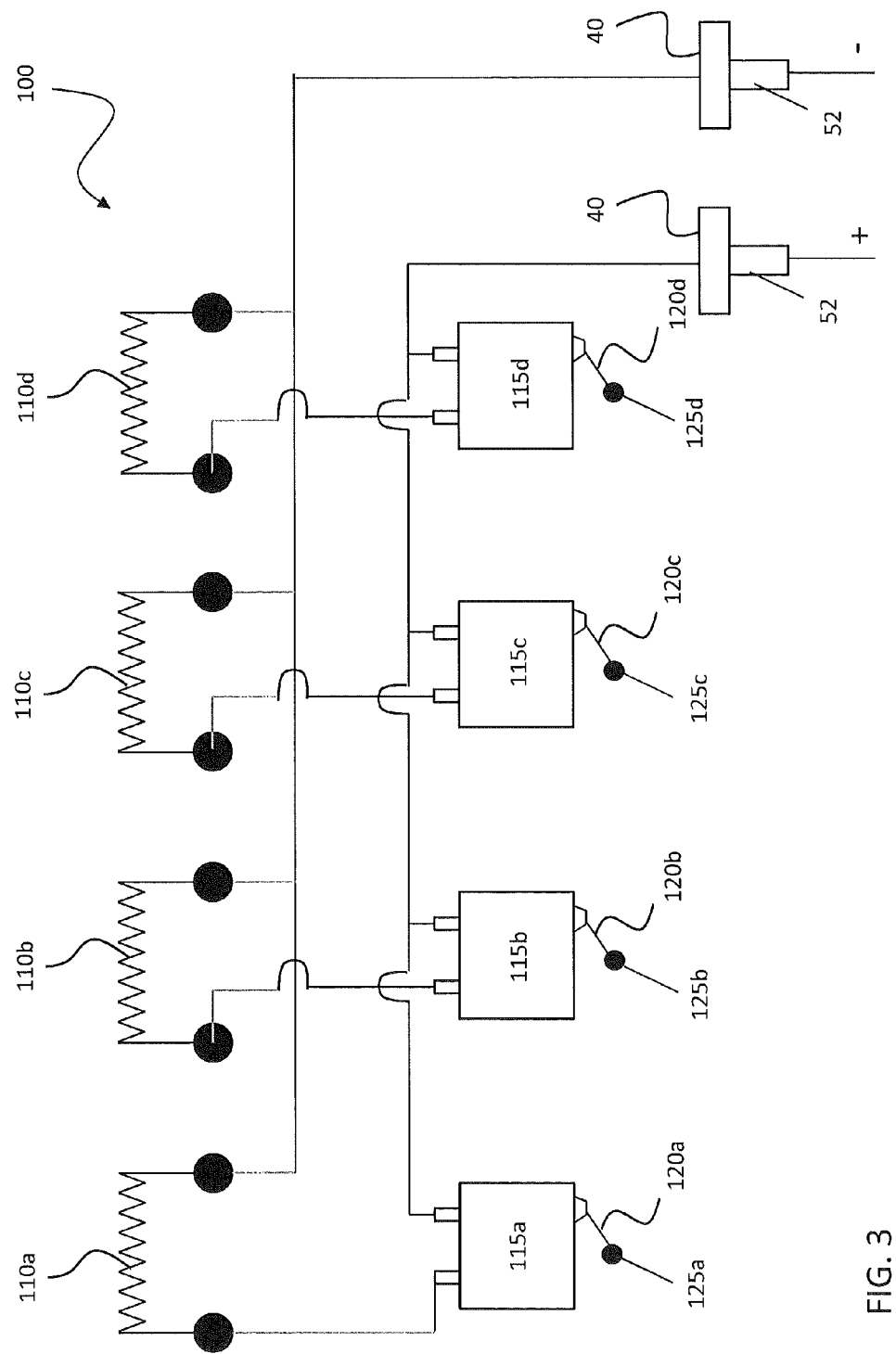
FIG. 3 is a schematic diagram of an electric circuit of the propeller assembly according to an embodiment of the invention.

Referring now to FIG. 3, an electrical circuit 100 of the propeller assembly 20 is provided. The propeller assembly 20 includes at least one stationary brush 52 configured to engage and transfer electrical power to at least one rotating slip ring 40. Power from the slip ring 40 is generally applied to the electrical deicers 26 of both blades 22 of a pair substantially simultaneously to balance the load on the propeller assembly 20. The electrical deicers 26 for each pair of blades 22 are represented by a resistor 110 in the electrical circuit 100. In the illustrated, non-limiting embodiment, the electrical circuit 100 includes four resistors 110a-110d, thereby indicating that the propeller assembly 20 includes eight blades 22. However, a propeller assembly 20 having any even number of propeller blades 22 is within the scope of the invention.

Each resistor 110 is operably coupled to the rotating slip ring 40 by a relay 115. For example, resistor 110a is connected to relay 115a, resistor 110b is connected to relay 115b, resistor 110c is connected to relay 115c, and resistor 110d is connected to relay 115d. The relays 115 are configured to control when power is supplied from the at least one rotating slip ring 40 to the electrical deicers 26 of each pair of blades 22. Each relay 115 includes an armature 120 configured to move between a first position and a second position. In one embodiment, the armature is a resilient flexible member. In another embodiment, a biasing member (not shown) is coupled to the armature 120 and configured to bias the armature 120 to the first position. When the armature 120 is in the first position, the circuit connecting the rotating slip ring 40 to a corresponding resistor 110 is interrupted. In the second position, the connection between the rotating slip ring 40 and a corresponding resistor 110 is complete such that electrical power from the slip ring 40 may be supplied thereto.

Application of a force to the free end 125 of the armature 120, such as with a movable portion 135 of an actuator 130 for example, causes the armature 120 to pivot from the first position to the second position. In one embodiment, the relays 115 are arranged generally linearly such that the movable portion 135 of the actuator 130 is configured to contact any of the armatures 120.

Figure 4:
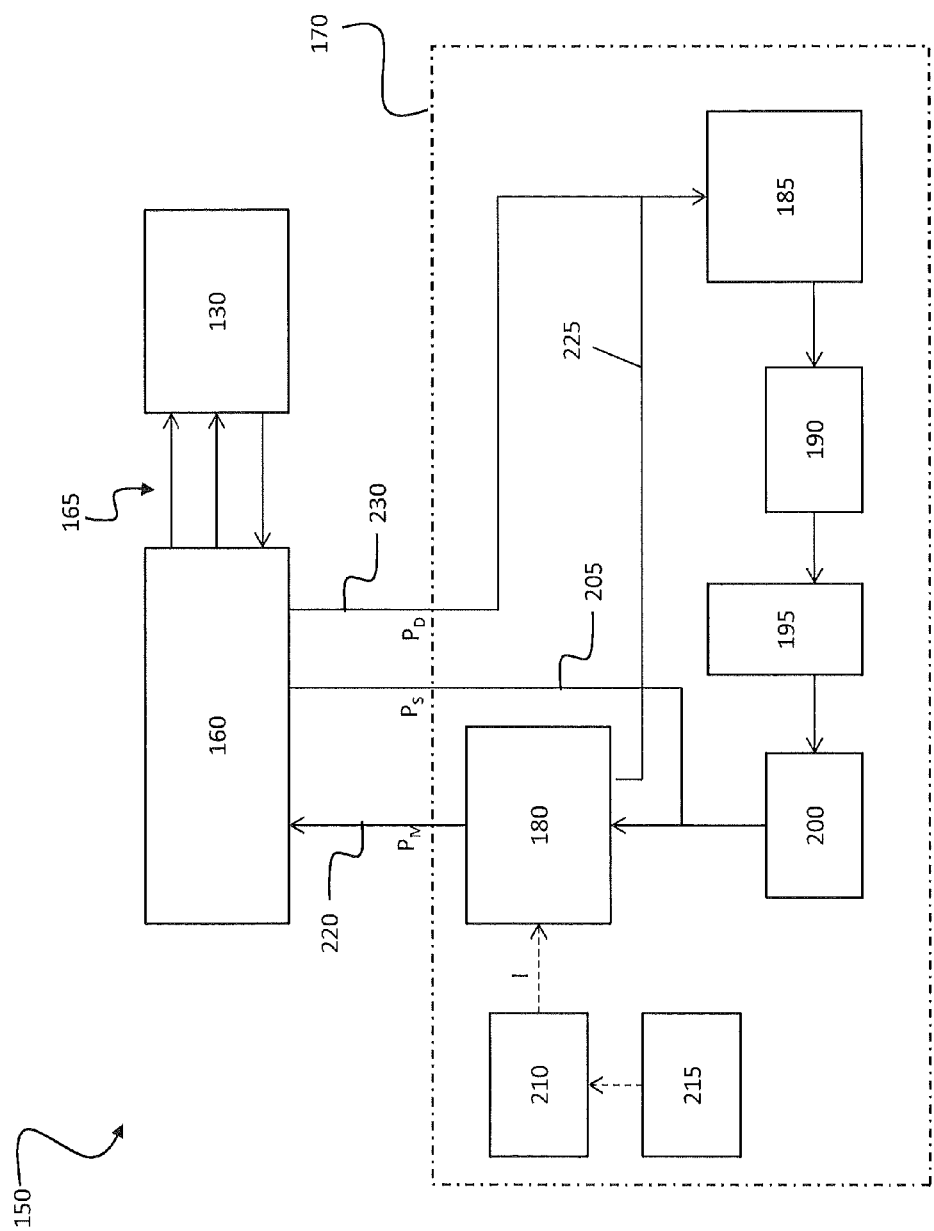
FIG. 4 is a schematic diagram of a system for moving the actuation mechanism according to an embodiment of the invention.

An example of a system 150 for moving the movable portion 135 of the actuator 130 in and out of contact with each of the relays 115 is illustrated in FIG. 4. The actuator 130 is fluidly coupled to a valve assembly 160 by one or more hydraulic lines 165 configured to transport fluid from the valve assembly 160 to the actuator 130 and vice versa in order to increase or decrease the fluid pressure in the actuator 130. The position of a movable portion 135 of the actuator 130 is controlled by the fluid pressure in the actuator 130 and may be selected such that the movable portion 135 of the actuator 130 mechanically contacts a free end 125 of an armature 120 of one of the relays 110.

In the illustrated non-limiting embodiment, the movable portion 135 of the actuator 130 includes a piston 140 having a shaft 145 with a cam surface 155 (see FIG. 5). The cam surface 155 of the movable portion 135 may be configured to contact only a single armature 120 such that power is supplied from the slip ring 40 to only one pair of electrical deicers 26 at any given time. As the cam surface 155 of the movable portion 135 of the actuator 130 moves into contact with an armature 120 of one of the relays 115, the cam surface 155 causes the free end 125 of the armature 120 to move from the first position to the second position. In response to a change in pressure of the actuator 130, the movable portion 135 moves axially out of contact with the armature 120 such that the armature 120 biases back to a first position. Actuators having other configurations not described herein are within the scope of the invention.

To adjust the fluid pressure in the actuator 130 and thus adjust the position of the movable portion 135, a fluid supply assembly 170 supplies hydraulic fluid to the valve assembly 160. Three hydraulic lines 205, 220, 230 connect fluid supply assembly 170 with the valve assembly 160. Hydraulic lines 205, 220 transfer fluid from the fluid supply assembly 170 to the valve assembly 160 and hydraulic line 230 returns fluid from the valve assembly 160 to the fluid supply assembly 170.

In one embodiment, the fluid supply assembly 170 includes a valve control mechanism 180, a reservoir 185, a pump 190, a filter 195, and a check valve 200. Pump 190 pumps hydraulic fluid from the reservoir 185, through filter 195 and the check valve 200. A portion of the hydraulic fluid bypasses the valve control mechanism 180 and is transferred directly through the hydraulic line 205 to the valve assembly 160 at a supply pressure $P_S$. The remaining hydraulic fluid goes through the valve control mechanism 180. In one embodiment, the valve control mechanism is an electro-hydraulic servo valve. A controller 210 provides a desired input current I to the valve control mechanism 180 using current supplied by an electrical supply 215. Based on the input current I, the valve control mechanism 180 transfers hydraulic fluid to the valve assembly 160 at a metered pressure $P_M$, which is proportional to the input current I. Thus a variable hydraulic pressure control signal is created and transferred from the valve control mechanism 180 through the hydraulic line 220 to the valve assembly 160. The valve control mechanism 180 includes a drain line 225 configured to transfer excess fluid back to the reservoir 185. Similarly, hydraulic line 230 transfers excess fluid from the valve assembly 160 back to the reservoir 185 at a pressure $P_D$.

The three fluid pressures $P_S$, $P_M$, $P_D$ within the valve assembly 160 correspond with the three hydraulic lines 205, 220, 230 connecting the valve assembly 160 with the fluid supply assembly 170. Depending on the fluid pressure within the actuator 130, the movable portion 135 moves to engage an armature 120 of one of the plurality of relays 115. The current supplied to the valve control mechanism 180, and therefore the fluid pressure within the actuator 130, may be varied such that the movable portion 135 of the actuator 130 engages the armature 120 of each of the relays 115 sequentially to power the electrical deicers 26 of each pair of blades 22 of the propeller assembly 20.

By using the power supplied from the interface between the rotating slip ring 40 and the electrical brush 52 to sequentially deice each pair of propeller blades 22, the overall deicing system is simplified. In addition, the number of slip rings 40 and brushes 52 required, and therefore the cost and weight of the propeller assembly 20 is reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller assembly comprising:
   a plurality of blades arranged in diametrically opposed pairs, each of the plurality of blades having an electrical deicer located thereon;
   a rotating slip ring;
   a stationary brush arranged in contact with the slip ring;
   a power source operably connected to the stationary brush such that electrical power is transferred from the power source to the slip ring through the stationary brush, and the electrical power is transferred from the slip ring to the electrical deicer; and an actuator having a movable portion configured to sequentially couple the electrical deicers of each pair of blades to the rotating slip ring.

2. The propeller assembly according to claim 1, wherein the actuator is configured to couple the electrical deicers of only a single pair of blades to the rotating slip ring at any given time.

3. The propeller assembly according to claim 1, wherein the electrical deicers of each pair of blades are coupled to the slip ring by a relay.

4. The propeller assembly according to claim 3, wherein the relay includes an armature movable between a first position and a second position, the armature being biased into the first position.

5. The propeller assembly according to claim 4, wherein when the armature is in the first position, power is not supplied form the slip ring to the electrical deicers of a pair of blades, and when the armature is in the second position, power is supplied from the slip ring to the electrical deicers of a pair of blades.

6. The propeller assembly according to claim 3, wherein each of the plurality of relays are arranged generally linearly.

7. The propeller assembly according to claim 3, wherein the movable portion of the actuator includes a shaft coupled to a piston, the shaft including a cam surface configured to contact the armature of at least one relay.

8. The propeller assembly according to claim 7, wherein the piston is arranged within the actuator, and the movable portion of the actuator is configured to move in and out of contact with each of the plurality of relays in response to a change in fluid pressure within the actuator.

9. The propeller assembly according to claim 8, further comprising:

a valve assembly in fluid communication with the actuator; and a fluid supply assembly in fluid communication with the valve assembly, the fluid supply assembly including a valve control mechanism isolated from the valve assembly.

10. The propeller assembly according to claim 9, wherein the valve control mechanism is configured to provide a variable hydraulic pressure control signal to the valve assembly, and the valve assembly is configured to transfer the fluid to the actuator as a function of the variable hydraulic pressure control signal.

11. The propeller assembly according to claim 10, wherein the valve control mechanism is an electro-hydraulic servo valve.

12. The propeller assembly according to claim 10, wherein the fluid supply assembly further comprises:

an electrical supply; and a controller for providing an input current, the input current being proportional to the variable hydraulic pressure control signal.

13. A method of sequentially supplying power to electrical deicers for each pair of blades of a propeller assembly comprising:

moving a movable portion of an actuator into contact with a first relay coupled to the electrical deicers of a first pair of blades;

transferring electrical power from a power source to a stationary brush, from the stationary brush to a rotating slip ring in contact with the stationary brush, and from the rotating slip ring to the electrical deicers of the first pair of blades; and moving the movable portion of the actuator into contact with a second relay coupled to the electrical deicers of a second pair of blades.

14. The method according to claim 13, wherein the movable portion of the actuator moves in response to a change in fluid pressure within the actuator.

15. The method according to claim 14, wherein the fluid pressure in the actuator changes in response to a hydraulic pressure control signal generated by a valve control mechanism.

* * * * *